(12) United States Patent
Kynett et al.

(10) Patent No.: US 6,446,019 B1
(45) Date of Patent: Sep. 3, 2002

(54) METHOD AND APPARATUS FOR CALIBRATING ANALOG SENSOR MEASUREMENT

(75) Inventors: Virgil Niles Kynett; Steven E. Wells, both of El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/222,235

(22) Filed: Dec. 29, 1998

(51) Int. Cl.$^7$ ............................................. G01D 18/00
(52) U.S. Cl. ............................ 702/104; 702/85; 702/86
(58) Field of Search .................... 702/85, 86, 99, 702/104, 130; 324/130, 132; 341/119, 120, 140; 374/171, 172; 73/204.17, 204.18, 204.19

(56) References Cited

U.S. PATENT DOCUMENTS 4,059,982 A * 11/1977 Bowman ..................... 702/136
4,812,747 A * 3/1989 Gale et al. .................. 702/104
5,488,368 A * 1/1996 Brown et al. ............... 341/119

FOREIGN PATENT DOCUMENTS

| EP | 0514634 A1 | 11/1992 | ............ G01D/3/02 |
| FR | 272664 A1 | 5/1996 | |
| FR | 2726644 | * 5/1996 | |

* cited by examiner

*Primary Examiner*—Bryan Bui
(74) *Attorney, Agent, or Firm*—Calvin E. Wells

(57) ABSTRACT

A method for calibrating analog sensor measurements within a computer system is disclosed. The method includes the steps of generating an analog sensor measurement result, reading at least two values that define a curve from a memory device, and calculating a calibrated result using the analog sensor measurement result and the values that define the curve.

6 Claims, 4 Drawing Sheets

METHOD AND APPARATUS FOR CALIBRATING ANALOG SENSOR MEASUREMENT

FIELD OF THE INVENTION

The present invention pertains to the field of analog sensors. More particularly, this invention pertains to the field of calibrating analog sensor measurements.

BACKGROUND OF THE INVENTION

Analog sensors may perform a variety of functions within a computer system, including sensing voltage levels and temperatures. Voltage sensors may measure supply voltages or other voltage levels throughout a computer system. Temperature sensors may measure the temperatures of system components, or may measure ambient temperature. Whenever voltage or temperature sensors are in use, the accuracy of any measurements are at issue. Sensor designers use elaborate and costly circuits to ensure the accuracy of sensor measurements. However, variations in the manufacturing process of sensing devices can lead to inaccurate results when the sensors are put into use.

To guard against inaccurate measurements, sensing devices are tested in order to ensure that the manufactured devices perform to within specifications. If a particular device's performance does not fall within specifications, the device is either discarded or circuit "trimming" is performed in order to bring the device's performance to within acceptable limits. Circuit "trimming" is performed by physically altering the device's circuits or components after testing. One technique used to trim analog devices is to use a laser to alter the physical dimensions of circuit components. Once the alteration is performed, the device must be tested again in order to ensure proper device behavior.

Both discarding and performing trimming operations on devices that do not pass testing serve to increase the cost of producing accurate sensing devices.

SUMMARY OF THE INVENTION

A method for calibrating analog sensor measurements within a computer system is disclosed. The method includes generating an analog sensor measurement result, reading at least two values that define a curve from a memory device, and calculating a calibrated result using the analog sensor measurement result and the values that define the curve.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of a method for calibrating analog sensor measurements includes generating an analog sensor measurement result that is not calibrated against an absolute scale such as centigrade in the case of a temperature measurement. The potentially inaccurate analog sensor measurement result is calibrated to an absolute scale by performing a calculation involving two values stored in a non-volatile memory. The values stored in the non-volatile memory define a line, with one value representing a slope of the line and the other value representing an intercept. The calculation is performed according to the equation $y=m*x+b$ where y represents a calibrated result, m represents the slope, x represents the analog sensor measurement result, and b represents the intercept. It is an intended advantage of the embodiment to produce accurate sensor measurements using system arithmetic logic unit (ALU) resources. It is a further intended advantage of the embodiment to eliminate the need for trimming analog sensor devices in order to produce acceptably accurate measurement results. It is another intended advantage of the embodiment to reduce the costs of producing sensor devices by eliminating the need for costly circuitry required in prior sensor devices to produce acceptably calibrated results. Further, it is an intended advantage of the embodiment to reduce the numbers of sensor devices that must be discarded during the manufacturing and testing process as a result of a device's failure to produce adequately accurate results. It is an additional intended advantage of the embodiment to reduce computer system manufacturer's need to match components when assembling system boards.

Figure 1:
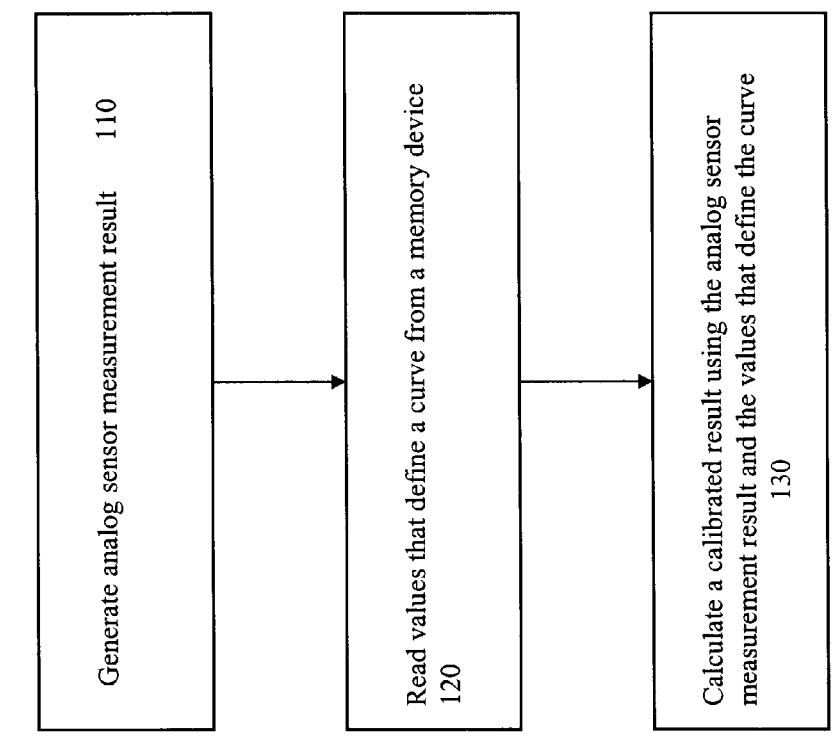
FIG. 1 shows a flow diagram of one embodiment of a method for calibrating analog sensor measurements.

FIG. 1 shows a flow diagram of one embodiment of a method for calibrating analog sensor measurements. At step 110, an analog sensor measurement result is generated. The analog sensor measurement may include a temperature measurement or a voltage measurement. Other types of measurements are also possible.

At step 120, values that define a curve are read from a memory device. The values that define a curve preferably represent slope and intercept values that define a line. The slope and intercept values are determined during a computer system manufacturing process. During the manufacturing process, at least two reference sensor measurements are performed. The results from the reference measurements are compared against a calibrated scale, such as centigrade in the case of temperature measurements. The reference measurements are used to determine an equation for a line that will allow potentially inaccurate in-system analog sensor measurements to be converted into calibrated measurements. Although the curve is mentioned as preferably being a line, other curve types are possible.

At step 130, a calibrated result is calculated using the analog sensor measurement result and the values that define the curve. As discussed above, the curve is preferably a line defined by a slope and an intercept, which are determined during the manufacturing process by performing at least two reference measurements. In the case of a line, the calculation is performed according to the equation $y=m*x+b$ where y represents the calibrated result, m represents the slope, x represents the analog sensor measurement result, and b represents the intercept.

Figure 2:
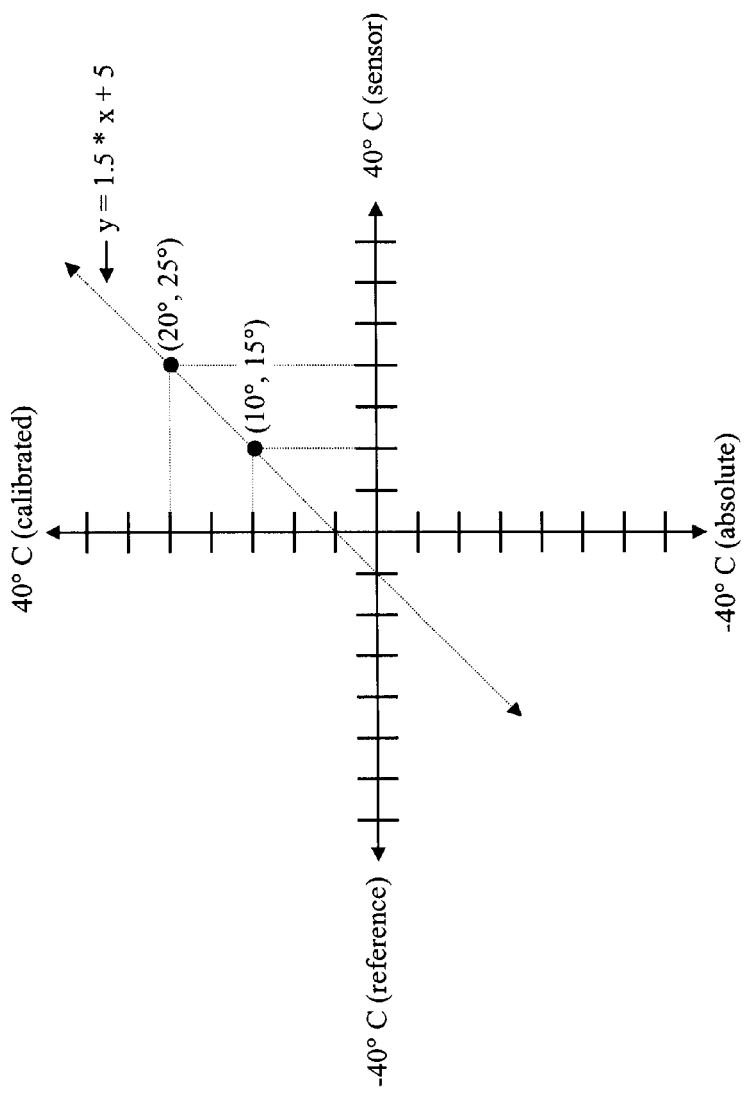
FIG. 2 depicts a graph of a line that is defined by two sensor measurement data points.

FIG. 2 illustrates an example of two analog sensor measurement data points defining a line that can be used to convert potentially inaccurate sensor measurements into calibrated measurements. For this example, the two data points shown in the graph represent ambient temperatures within a computer chassis. Each temperature measurement is taken by first bringing the ambient temperature within a computer chassis to a known, calibrated temperature. For each calibrated temperature, a sensor measurement is then performed. The calibrated temperatures and the corresponding sensor measurement results form the data points. The example of FIG. 2 shows calibrated temperatures of 15° C. and 25° C. The analog sensor measurements taken at each of these temperatures are 10° C. and 20° C., respectively. The line defined by the two data points has the equation y=1.5*x+5°, where y represents a calibrated temperature and x represents a sensor measurement. Assuming that the analog sensor performs in a linear fashion over the range of temperatures of interest, any analog sensor measurement can be calibrated by using the equation of the line to calculate the calibrated result.

Figure 3:
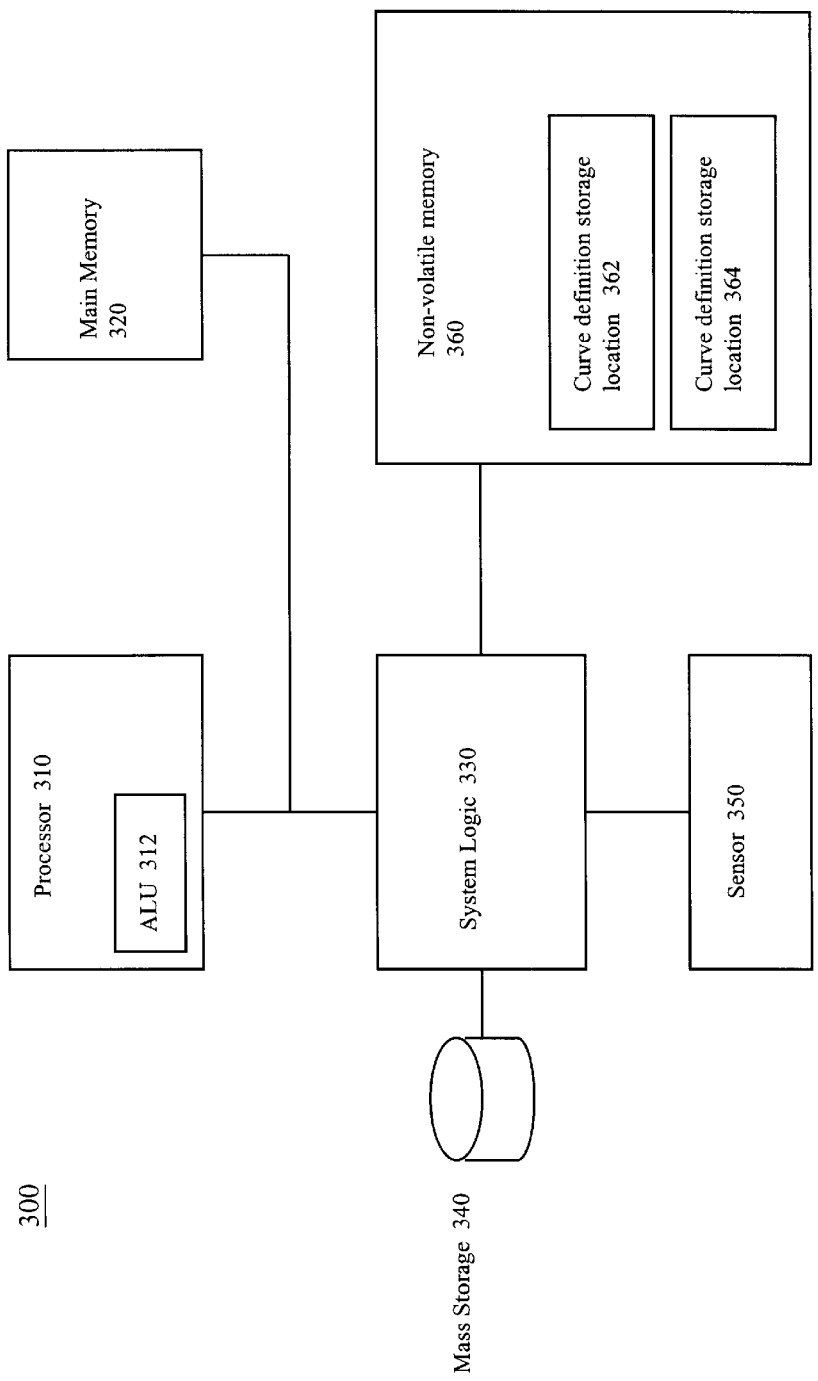
FIG. 3 is a block diagram of one embodiment of a computer system including a non-volatile memory device that includes curve definition storage locations.

FIG. 3 is a block diagram of one embodiment of a computer system 300 including a non-volatile memory device 360 that includes curve definition storage locations 362 and 364. The system 300 also includes a processor 310, a main memory 320, a system logic device 330, a mass storage device 340, and a sensor 350. The processor includes an arithmetic logic unit (ALU) 312. The sensor 350 is intended to represent a broad range of sensor devices, including, but not limited to, temperature and voltage sensors.

The sensor 350 typically senses an analog value such as a temperature or a voltage and converts the analog value to a digital representation, which can be read by the processor 310. The processor 310 also reads the information stored in the curve definition storage locations 362 and 364. For this example embodiment, the information stored in the curve definition storage locations 362 and 364 preferably represents a slope and an intercept that defines a line, as discussed above in connection with FIGS. 1 and 2.

Once the processor has received the digital representation of the analog sensor measurement and the information stored in the curve definition storage locations 362 and 364, the ALU 312 performs calculations according to the equation y=m*x+b, where y represents a calibrated measurement result, m represents the slope, x represents the digital representation of the analog sensor measurement, and b represents the intercept. The calibrated result may be provided to the system logic 330 for use by other system resources, or may be stored to the main memory 320, the mass storage device 340, or the non-volatile memory device 360 for later retrieval.

Figure 4:
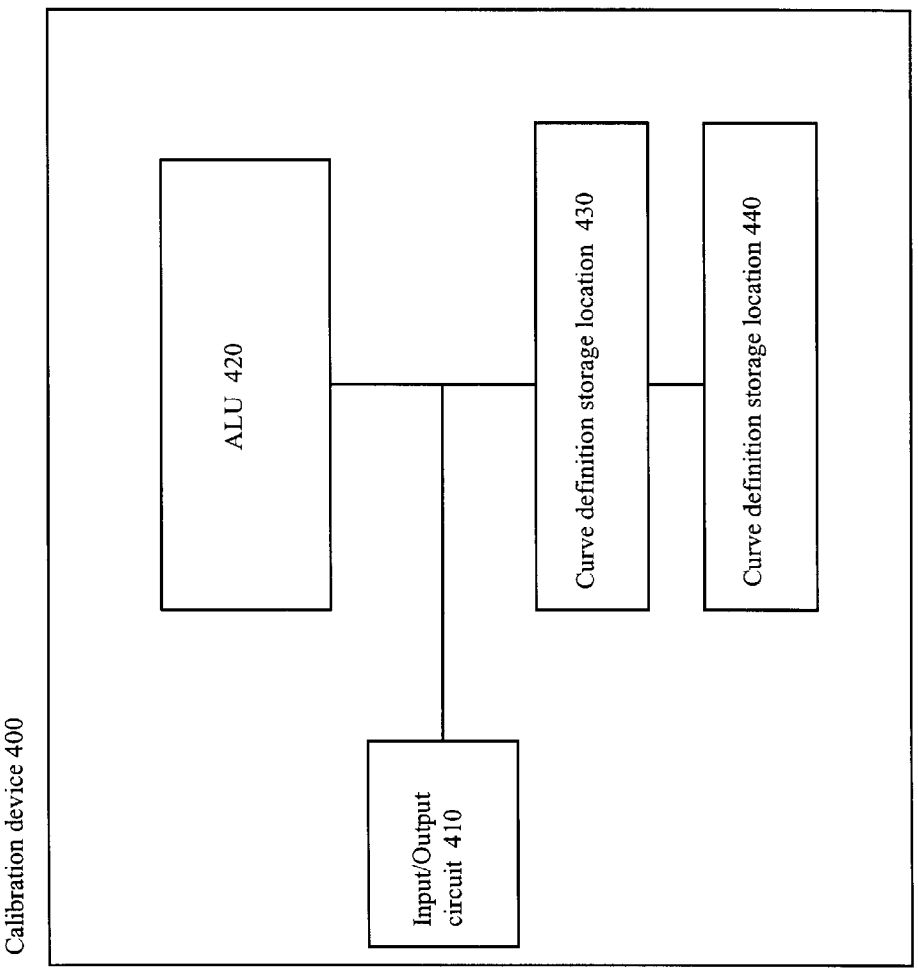
FIG. 4 is a block diagram of one embodiment of a calibration device.

FIG. 4 is a block diagram of one embodiment of a calibration device 400. The calibration device 400 includes an input/output circuit 410, a calculation circuit 420, and two curve definition storage locations 430 and 440. The curve definition storage locations 430 and 440 preferably store a slope and an intercept that define a line, as described above in connection with FIGS. 1 through 3. The input/output circuit 410 receives an uncalibrated sensor measurement and forward the measurement to the calculation circuitry 420, or alternatively to a storage location. The calculation circuitry 420 receives the uncalibrated measurement and the information stored in the curve definition storage locations 430 and 440 and performs calculations according to the equation y=m*x+b, where y represents a calibrated result, m represents the slope, x represents the uncalibrated measurement, and b represents the slope. The calibrated result may be output via the input/output circuit 410, or may be stored to a storage location for later retrieval.

The calibration device 400 is preferably implemented in a non-volatile memory device, such as a flash electrically-erasable programmable read only memory array (flash EEPROM). Alternatively, the calibration device may be implemented in a system logic device, or as a discrete device.

Although the above example embodiments discuss storing slopes and intercepts that define lines, it is also possible to store measurement data. The calculations to calibrate a sensor result can then include calculations to determine a slope and intercept. Further, it is also possible to use equations for curves other than lines. More than two curve definition values and curve definition storage locations can be used to define more complex curves.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:

at least two non-volatile memory locations that store values that define a line, wherein the first memory location stores a slope of the line and the second memory location stores an intercept of the line;

an input to receive a sensor measurement value; and a calculation circuit to calculate a calibrated measurement result using the values that define the line and the sensor measurement value, wherein the calibrated measurement is produced according to the formula y=m*x+b, wherein m represents the slope, b represents the intercept, x represents the analog sensor measurement result, and y represents the calibrated result.

2. The apparatus of claim 1, wherein the at least two non-volatile memory locations are electrically erasable programmable read only memory cells.

3. A system, comprising:

an input/output circuit;

a calculation circuit coupled to the input/output circuit; and a first non-volatile memory location and a second non-volatile memory location coupled to the calculation circuit, wherein the first non-volatile memory location stores a slope of a line and the second non-volatile memory location stores an intercept of the line.

4. The system of claim 3, further comprising a sensor coupled to the input/output circuit.

5. The system of claim 4, wherein the calculation circuit calculates a calibrated result using the slope stored in the first non-volatile memory location, the intercept stored in the second non-volatile memory location, and data measured by the sensor.

6. The system of claim 3, wherein the calculation circuit comprises a processor.

* * * * *